Aug. 1, 1967     J. W. ROCKWELL     3,333,862
STEERING CONSTRUCTION FOR VELOCIPEDES
Filed Sept. 8, 1965
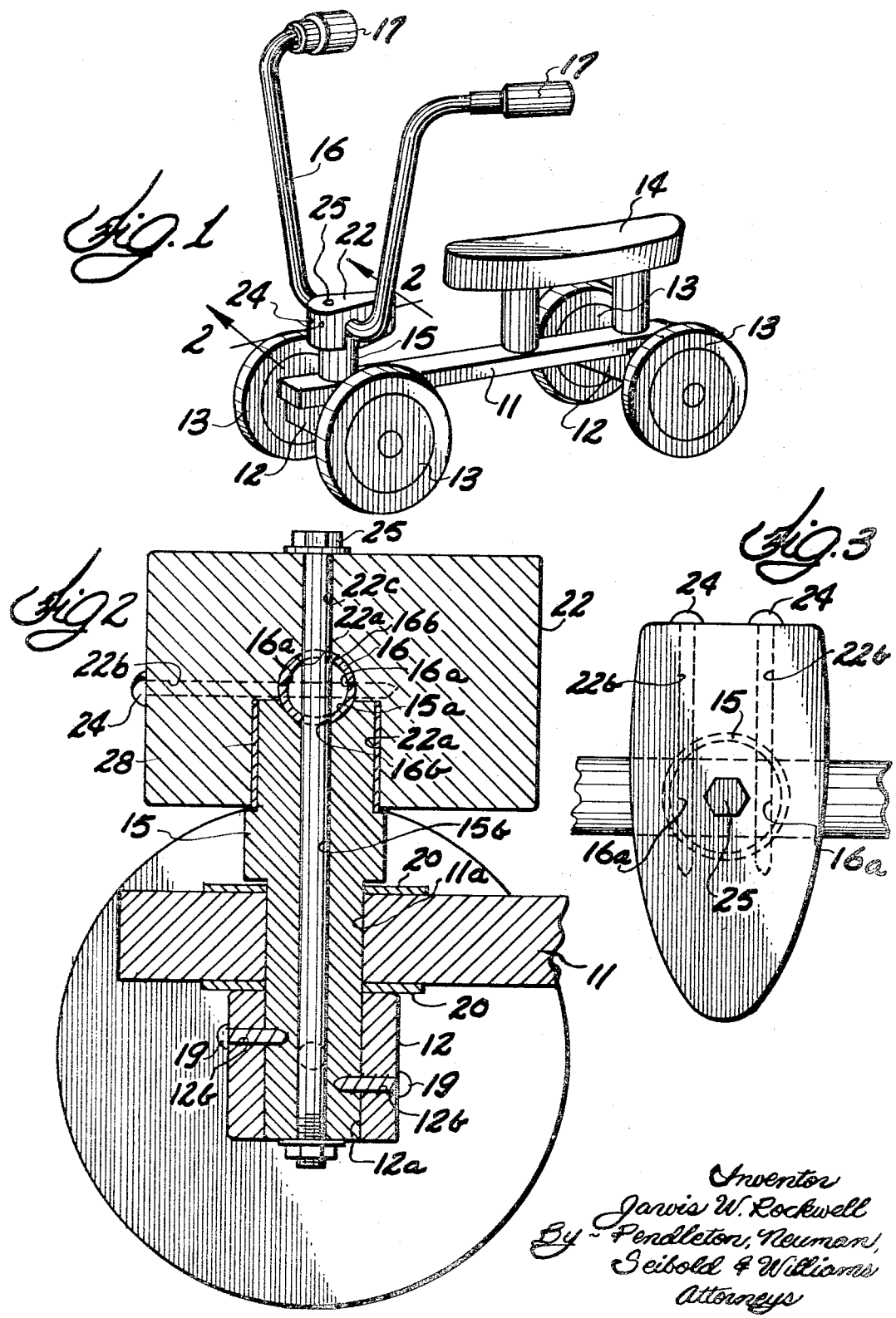

United States Patent Office 3,333,862
Patented Aug. 1, 1967

3,333,862
STEERING CONSTRUCTION FOR VELOCIPEDES
Jarvis W. Rockwell, Chicago, Ill., assignor to Playskool Manufacturing Company, Chicago, Ill., a corporation of Illinois
Filed Sept. 8, 1965, Ser. No. 485,821
7 Claims. (Cl. 280—87.02)

The present invention relates in general to a steering construction and more specifically to a steering construction for children's toy scooters, velocipedes or the like.

Many bicycles today are constructed with high handle bars commonly called "angel bars" in order to provide a sleek design. Due to the leverage or torque resulting from the use of such high handle bars, the point of handle bar connection is a crucial strength point. Consequently, it is desired to provide a sturdy handle bar connecting construction which will withstand this leverage pressure. In a bicycle constructed of steel or the like, this connection presents no problems. However, where as in a child's velocipede the construction is usually of wood or plastic, the connection of the high handle bars is a problem since the usual metal-to-metal clamping action cannot usually be obtained.

A primary object of the present invention is to provide a new and improved steering construction. Another object is to provide a new and improved steering construction for toy scooters, velocipedes or the like.

A more specific object of the present invention is to provide a new and improved steering construction for a velocipede or the like wherein the handle bar is connected to a steering post for concurrent movement therewith and wherein the steering post is strengthened. In this connection, it is an object to provide a sturdy steering construction of this type.

A general object of the present invention is to provide a new and improved steering construction characterized in its simplicity, economy and ease of construction.

Other objects and advantages of the present invention will become apparent upon reading the attached detailed description taken in conjunction with the drawing.

In one form of the present invention a steering construction for a child's velocipede or the like is provided, which includes a steering post and a handle bar mounted on the steering post. A connecting block is adapted to fit over associated portions of the handle bar and the steering post and means are provided for connecting the connecting block, the handle bar and the steering post together for concurrent movement and for strengthening the steering post. The steering post strengthening means may include means surrounding the portion of the steering rod covered by the connecting block.

For the purpose of providing a detailed description of the present invention reference is made to the drawing wherein:

FIG. 1 is a perspective view of a child's velocipede having a steering construction embodying the principles of the present invention;

FIG. 2 is a sectional view of the steering construction of FIG. 1 taken substantially along line 2—2; and FIG. 3 is a top-elevational view of the steering construction shown in FIG. 1.

While the invention has been shown and will be described in some detail with reference to a particular exemplary embodiment thereof, there is no intention that it be limited to such detail. Quite to the contrary it is intended here to embrace all modifications, alternatives, and equivalents falling within the spirit and scope of the invention as defined by the appended claims.

Referring now to the drawing and more specifically to FIG. 1 a child's velocipede is shown which includes a steering construction embodying the principles of the present invention. The velocipede includes a frame 11 mounted on axles 12 which have wheels 13 associated therewith. A seat 14 is suitably mounted on the frame 11 and a steering post 15 associated with the front axle 12. A handle bar 16 having hand grips 17 disposed thereon is connected to the steering post 15 in accordance with the teachings of the present invention so that the handle bar and steering post move concurrently whereby the front axle 12 and the associated wheels 13 may be turned. The frame 11, the axle 12, the seat 14 and the steering post 15 may be suitably constructed of a rugged wood material. On the other hand, the wheels 13 may be molded plastic wheels and the handle bar 16 may be constructed of a suitable metal.

Referring now to FIGS. 2 and 3, the steering construction embodying the principles of the present invention is shown. As may be seen, the steering post 15 extends through an aperture 11a in the frame 11 so that the steering post may be connected to both the handle bar 16 and the front axle 12. For the purpose of securing the steering post 15 to the axle 12, the steering post extends through an aperture 12a in the axle and screws 19 are threaded through apertures 12b in the axle into the steering post. In the exemplary arrangement, washers 20, which may be formed of a hard fiber material, are disposed between the frame 11 and the steering post 15 and between the frame 11 and the front axle 12 to allow the steering post and the front axle to readily rotate relative to the frame.

In accordance with the present invention, a groove 15a is formed in the upper end of the steering post 15 and a portion of the handle bar 16 is received therein. Additionally, a connecting block 22 is provided which has a recessed portion 22a formed therein adapted to receive associated portions of the steering post and the handle bar so that the associated portion of the handle bar may be secured between the steering post and the connecting block. In the exemplary arrangement, a pair of screws 24 are provided which extend through aligned apertures 22b and 16a in the connecting block and the handle bar and are threaded into the rear portion of the connecting block 22, i.e., the portion of the connecting block to the right of the handle bar as viewed in FIG. 2, so that the connecting block and the handle bar are connected together thereby. However, it will be apparent that the velocipede may be constructed without employing the screws 24 and that the operation of the velocipede will not be impaired if the screws 24 are omitted. Additionally, a bolt 25 is provided which extends through aligned bores 22c, 16b and 15b respectively in the connecting block 22, the handle bar 16 and the steering post 15. The bolt secures together the connecting block, the handle bar and the steering post so that these elements rotate concurrently. Consequently, when rotational movement is imparted to the handle bar 16, the connecting block 22 and the steering post 15 rotate therewith. Since the steering post is connected to the front axle 12, it follows that the front axle and the wheels 13 will likewise rotate with the handle bar so that turning movement is imparted to the disclosed bike. Moreover, it will be readily apparent that, in addition to insuring that the connecting block 22, the handle bar 16 and the steering post 15 rotate concurrently, the bolt 25 functions to strengthen the steering post 15 since it extends axially therethrough.

The disclosed connecting block 22 may be constructed of a sturdy wood material. Alternatively, the connecting block may be of a molded plastic construction. In this latter connection, the connecting block may be formed of two sections which are suitably secured together to clamp the handle bar 16 therebetween.

For the purpose of adding further strength to the steering post, a ferrule 28 which may be constructed of a sturdy material such as steel is forced to fit into surrounding relationship with the upper portion of the steering post 15 received within the connecting block 22. It will be readily apparent that the ferrule 28 will strengthen this portion of the steering post.

In view of the foregoing, it will be seen that a new and improved steering construction has been provided for use with a child's velocipede or the like. Moreover, it will be readily apparent that the steering construction embodying the principles of the present invention not only insures that the handle bar is connected to the steering post, but in addition functions to strengthen the steering post. Thus, a child's velocipede provided with the disclosed handle bar connecting construction will have sufficient strength to withstand the leverage pressure applied to the handle bar connection resulting from the use of high handle bars 16.

What is claimed is:

1. In a steering construction for a velocipede or the like, the combination which comprises a steering post, a handle bar mounted on the steering post, a connecting block adapted to fit over associated portions of the handle bar and the steering post, at least one screw extending through associated portions of the connecting block and the handle bar for securing the connecting block and the handle bar together, and a bolt extending through aligned bores in the connecting block, the handle bar and the steering post for connecting the connecting block, the handle bar and the steering post together for concurrent movement and for strengthening the steering post.

2. In a steering construction for a velocipede or the like, the combination which comprises a steering post having a groove in the end thereof, a handle bar mounted on the steering post in said end groove, a connecting block having recesses formed therein adapted to fit over and receive associated portions of the steering post and the handle bar, and means extending through the connecting block, the handle bar and the steering post for securing the connecting block, the steering post and the handle bar together for concurrent movement.

3. In a steering construction for a velocipede or the like, the combination which comprises a steering post, a handle bar mounted on the steering post, a connecting block adapted to fit over portions of the handle bar and the steering post, first fastener means extending through the connecting block and the handle bar for securing the connecting block to the handle bar, and second fastener means for securing the connecting block, the handle bar and the steering post together for concurrent movement.

4. In a steering construction for a velocipede or the like, the combination which comprises a handle bar, a steering post having a groove formed therein wherein a portion of the handle bar is received, a connecting block adapted to fit over associated portions of the handle bar and the steering post, and means including a bolt extending through the connecting block, the handle bar and the steering post for securing the connecting block, the handle bar and the steering post together for concurrent movement and for strengthening the steering post.

5. In a steering construction for a velocipede or the like, the combination which comprises a handle bar, a steering post having a groove formed therein wherein a portion of the handle bar is received, a connecting block having recesses formed therein adapted to receive associated portions of the handle bar and the steering post, a pair of screws extending through the connecting block and the handle bar for connecting the handle bar and the connecting block together, a bolt extending through aligned bores in the connecting block, the handle bar and the steering post for connecting the connecting block, the handle bar and the steering post together for concurrent movement and for strengthening the steering post, and a ferrule force fit into surrounding relationship with the portion of the steering post received in the connecting block for strengthening that portion of the steering post.

6. In a velocipede or the like, the combination which comprises a main frame, a front axle supporting a pair of front wheels, at least one rear wheel mounted on the frame, a steering post extending through the frame and the front axle, a handle bar mounted on the steering post, a connecting block adapted to fit over associated portions of the handle bar and the steering, and means for securing the connecting block, the steering post, the handle bar and the front axle together on the frame for concurrent movement and for strengthening the steering post.

7. A structure of claim 3 wherein said second fastener means extends through the connecting block, the handle bar, and the steering post, and said first and second fastener means are substantially normal to one another.

References Cited

UNITED STATES PATENTS

| 1,470,441 | 10/1923 | Green | 280—87.05 |
| 1,472,611 | 10/1923 | Mettler | 280—87.02 |
| 2,768,834 | 10/1956 | Wilson | 280—278 X |

FOREIGN PATENTS

| 393,901 | 11/1908 | France. |

LEO FRIAGLIA, *Primary Examiner.*

UNITED STATES PATENT OFFICE
CERTIFICATE OF CORRECTION

Patent No. 3,333,862                              August 1, 1967

Jarvis W. Rockwell

It is certified that error appears in the above identified patent and that said Letters Patent are hereby corrected as shown below:

Column 4, line 32, after "steering" insert -- post --.

Signed and sealed this 1st day of July 1969.

(SEAL)
Attest:

Edward M. Fletcher, Jr.                        WILLIAM E. SCHUYLER, JR.
Attesting Officer                                    Commissioner of Patents